May 13, 1958 P. W. DAINO ET AL 2,834,544

ACCUMULATOR CARRY MEANS

Filed Dec. 24, 1956 5 Sheets-Sheet 1

INVENTORS.
PETER W. DAINO
CHARLES B. STOTT

BY Andrew Taras

AGENT

May 13, 1958 P. W. DAINO ET AL 2,834,544

ACCUMULATOR CARRY MEANS

Filed Dec. 24, 1956 5 Sheets-Sheet 4

May 13, 1958 P. W. DAINO ET AL 2,834,544

ACCUMULATOR CARRY MEANS

Filed Dec. 24, 1956 5 Sheets-Sheet 5

United States Patent Office
2,834,544
Patented May 13, 1958

2,834,544

ACCUMULATOR CARRY MEANS

Peter W. Daino and Charles B. Stott, Endwell, N. Y., assignors to International Business Machines Corporation, New York, N. Y., a corporation of New York Application December 24, 1956, Serial No. 630,321
11 Claims. (Cl. 235—61.6)

Figure 3:
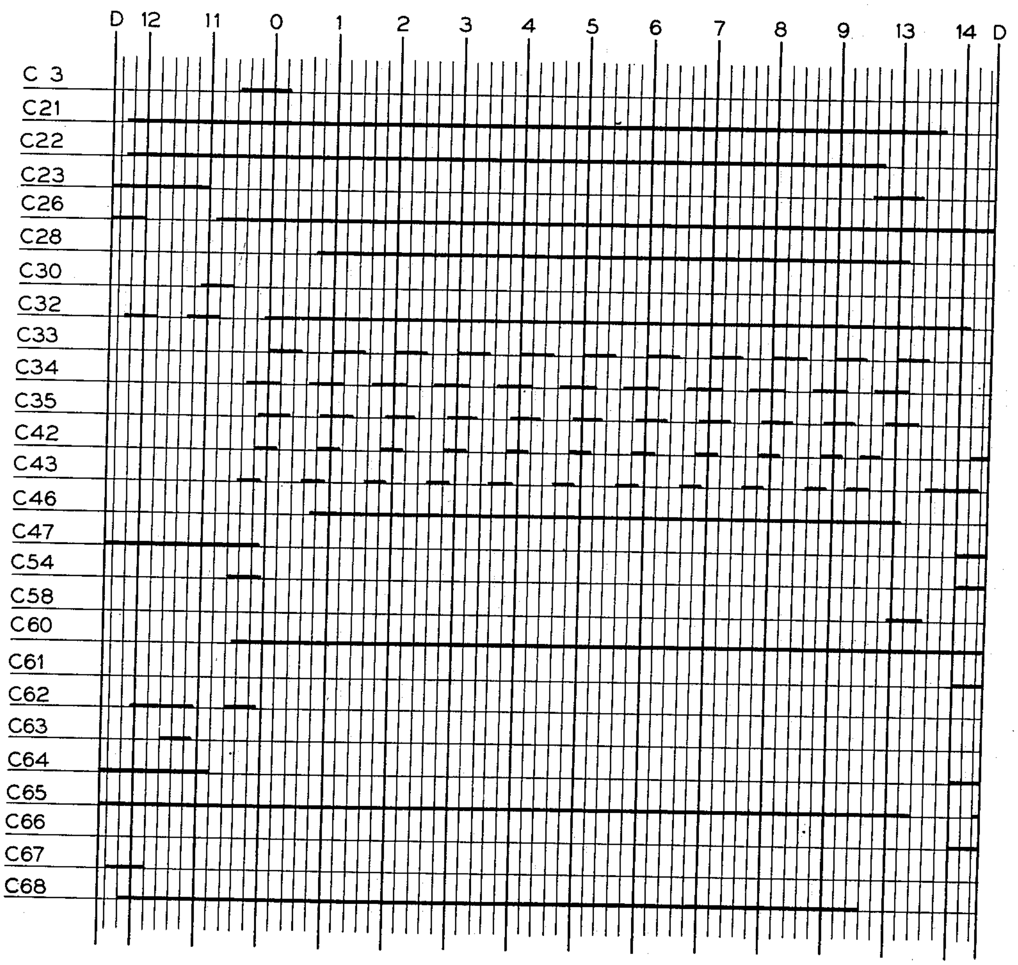

The invention relates to accumulators and more specifically to improvements in the carry operations thereof.

The invention is directed to the class of record controlled accumulators of the type in which storage of a value is effected by automatically initiating the driving operations of the accumulator at the start of a cycle and stopping such operation at one of ten differential points, 0 through 9, in the cycle, depending upon the value of the digit presented for entry. For example, a 0 value entry stores a 0, a 9 value entry stores a 9, but a blank, i. e, an unpunched column of a record, enables a storage of a 10 value, the effect of which provides no change in the accumulator except to yield an invalid carry that provides the accumulator with an erroneous result.

The condition of a blank column is apt to occur in those areas or columns of a record field that are to the left of the column bearing the highest order columnar value of a number or an amount. The practice in general has been to fill out these columns to the left with 0 designations in order to assure proper accumulation in the accumulator.

The failure to provide the 0 designations where they are intended either to the left of the highest order columnar digit or within the number itself, is caused in the main by human errors and to a lesser degree by machine errors.

Various procedures including complex plugging controls have been attempted at one time or another to guard against the occurrence of these blank columns. These, however, have been discarded owing to their cumbersome and complex nature.

The main object of the present invention therefore resides in an improved carry control means for accumulators that will obviate the above limitations.

Another object resides in the provision of improved entry and carry accumulator controls which are not dependent upon either the absence or presence of zeros to the left of the highest significant digit in variable size numbers or amounts.

A more specific object resides in the provision of a multi-cathode gas discharge accumulator incorporating improved entry and carry control means for effecting accumulation of amounts in a most expeditious manner.

Other objects of the invention will be pointed out in the following description and claims and illustrated in the accompanying drawings, which disclose, by way of examples, the principle of the invention and the best mode, which has been contemplated, of applying that principle.

Figure 1:
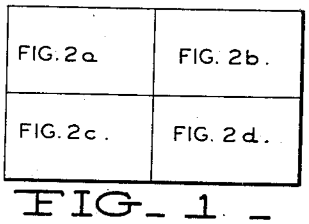

In the drawings:

Fig. 1 is a block diagram showing how Figs. 2*a* to 2*d*, inclusive, are arranged to form the wiring diagram.

Figs. 2*a* to 2*d*, inclusive, constitute the wiring diagram of the invention.

Fig. 3 is an electrical timing chart.

As a preliminary to a detailed explanation of the invention, it may be well to describe generally the nature of the preferred embodiment which utilizes in each order position a multi-cathode gas discharge accumulator of the type mentioned above, and carry means constituting a thyratron, which is fired each time the associated order position yields a carry.

Each accumulator cycle is divided into an entry portion and a carry portion. During the entry portion of the cycle, amounts are entered either additively or subtractively. During the carry portion of the cycle, carry operations are performed including these propagated during carry operations.

An entry operation within the accumulator whereby a value is stored is initiated automatically at the start of an accumulating cycle and terminated within the entry portion of the cycle at differential times in response to the sensing of one of the card perforations 0 through 9, the perforations being sensed in the order stated. Thus, an accumulating cycle will start operations at some precise starting time (zero time) and terminate when the perforation in the card is sensed. As an example, assuming the value 5 to be perforated in the card, and applying the above rule of operation, the accumulator begins operation at zero time and terminates at five time thus leaving a 5 value setting in the accumulator. The accumulation of a 0 value (0 perforation in the card) would result in a start operation and a stop operation being effected at the same time, the latter canceling the former, thus resulting in no advance of the accumulator. Since a maximum of ten units, or steps, of advance is permitted in each entry portion in each cycle of operation, as will be explained in detail later on, the accumulator order position will advance ten such units in each case where a blank column is the source of an entry. This is because the blank column provides no means for terminating operations of the accumulator order during the entry portion of a cycle. The ten unit advance enabled by a blank column (the absence of a digit value) is referred to as an invalid entry as opposed to a valid entry containing digit values 0–9, inclusive, whereby operations of the accumulator are terminated at differential times under control of any one of the perforations 0 through 9.

Associated with each accumulator order position is an entry means which includes a controllable means in the form of a count control relay energized in response to the entry of any one of the digit values 0 through 9, which values are sensed from the perforations encountered by the sensing means as the card passes through the accounting machine. In the absence of a perforation in the card column being sensed, the count control relay is therefore not energized. In effect the relay is responsive to valid entries and nonresponsive to invalid entries.

Also associated with each accumulator order position is an appropriate carry storage means which includes a normally nonconducting thyratron. Each time a carry is yielded during the entry portion of a cycle, the associated thyratron is fired to accordingly store a carry. At carry time in the cycle, carry operations are effected into the immediate higher order accumulator positions. During this carry operation, other carry operations may be propagated as a consequence to the orders standing at nine at the time carry is initiated. These latter carries are effected serially from the low order position to the higher order positions and constitute the propagated carries earlier referred to.

The plate circuit of each carry thyratron is conditioned by carry storage enabling means in the form of a pair of switch controls, or contacts, wired in parallel. One of said contacts is normally open and is closed whenever the associated count control relay is energized in response to a valid entry during an entry operation. The other contact is normally closed and is operated to open up at the completion of the entry portion of the cycle but before the carry portion of the cycle this contact being designated a test point in the wiring diagram. By virtue of this arrangement, the plate circuit of the carry thyratron will either be closed or open at the completion of an entry depending upon whether the count control relay point is in either a closed or open position, the operation of the relay depending upon whether or not a perforation was sensed during the entry portion of the cycle, or in other words, whether the entry was valid or invalid. In this way a stored carry arising as a result of an invalid entry may be cleared out by virtue of the carry tube extinguishing upon the opening of the test contact. On the other hand, a stored carry arising from a valid entry will remain stored in the thyratron during the time the test point opens since the plate circuit in this case will remain closed as a result of the associated count control relay being energized in response to a valid entry.

Moreover, after extinguishing the carry thyratron to clear out an invalid stored carry, the plate circuit of the thyratron is again closed to enable propagated carries arising from carry operations in the lower order positions to pass through the carry thyratron under consideration and into the immediate higher order positions.

Before entering upon a detailed description of the invention it will be necessary to first describe briefly the structure of the multi-cathode gas tube device earlier referred to, which tube constitutes a portion of each order position of the accumulator. This type of gas tube has been described in a number of applications assigned to the common assignee, reference being invited particularly to the application of C. B. Stott and P. W. Daino entitled "Self-Complementing Gas Tube Accumulator," Serial No. 433,222, filed May 28, 1954. In said application, the self-complementing gas tube is utilized to effect storage of digit values in response to an appropriate number of applied positive pulses.

The accumulator includes ten digit representing cathodes, ten transfer cathodes, ten complement cathodes and a single anode common to all cathodes. Entry of data is effected by the transfer of a single glow discharge from one digit representing cathode to the next in step-by-step fashion. Entry operations for both addition and subtraction are effected by activating the cathodes in succession to cause the glow transfer to be stepped along a glow transfer path. To effect such operation a number of positive input pulses are applied to the digit representing cathode equal to the true value of the number to be added or subtracted. For an additive operation the accumulator is complemented prior to and after the entry of the amount into the accumulator. The accumulator is complemented by supplying a complement pulse simultaneously to all digit cathodes. A complement cathode is arranged in glow transfer relation with each digit representing cathode to effect glow transfer therefrom to the digit representing cathode representing the complement digit. In the embodiment representing the 9's self-complementing feature, for example, one complement cathode effects glow transfer from the 2 cathode to the 7 cathode and another complement cathode effects glow transfer from the 7 cathode to the 2 cathode, etc.

The invention may also be employed with step-by-step operated accumulators of the type shown and described in the Patent No. 2,738,130 issued to J. E. Dayger et al.

In the drawings of the instant application, a two-order position accumulator is shown which accumulator utilizes in each order position thereof the type of multi-cathode self-complementing gas tube device described. The various cathodes and elements of the gas tube as represented herein will now be described. The description will of course be limited to the gas tube 54 shown in the units position, as a description of one tube will suffice for the other tube 55.

Figure 2A:
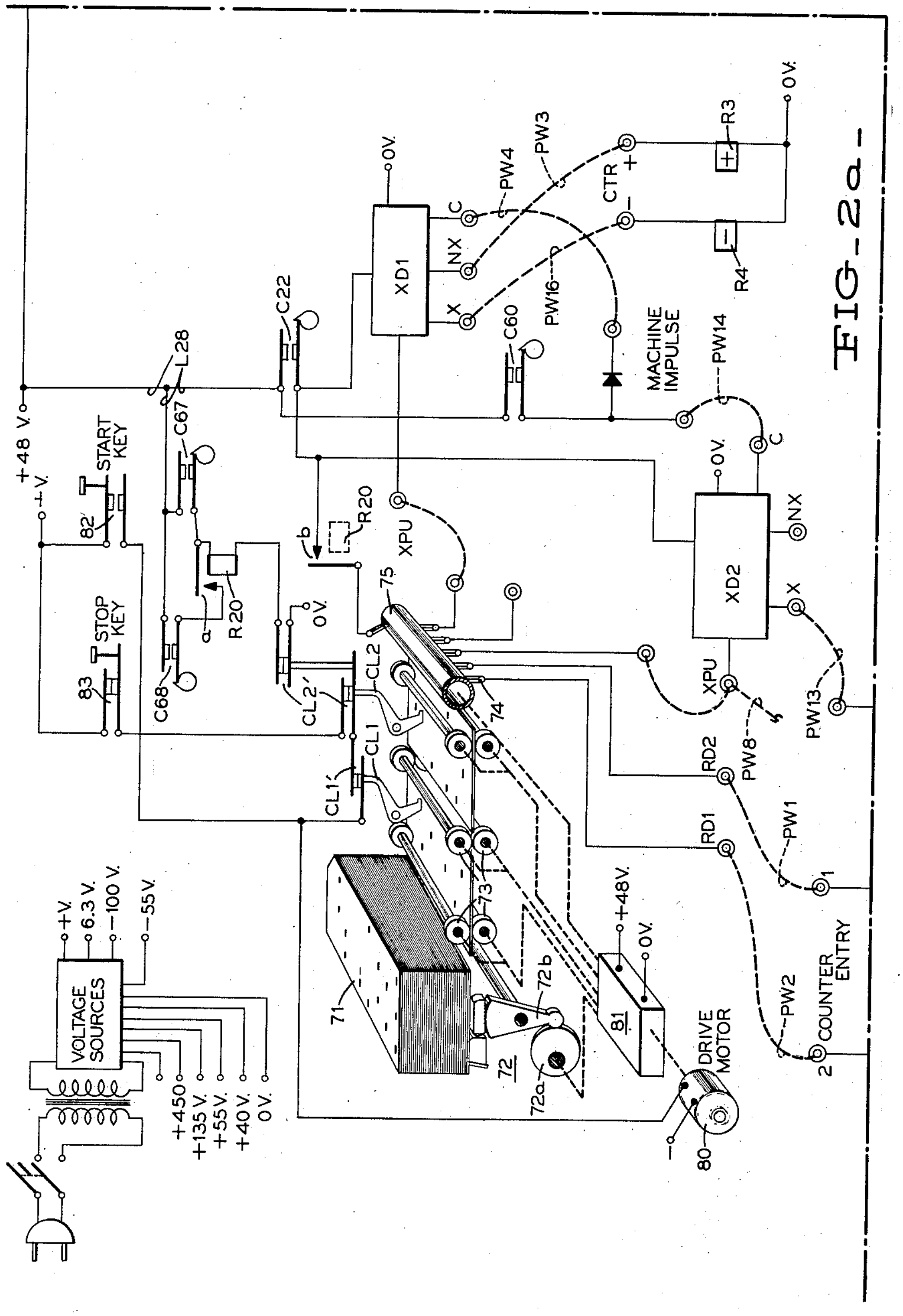
Figure 2B:
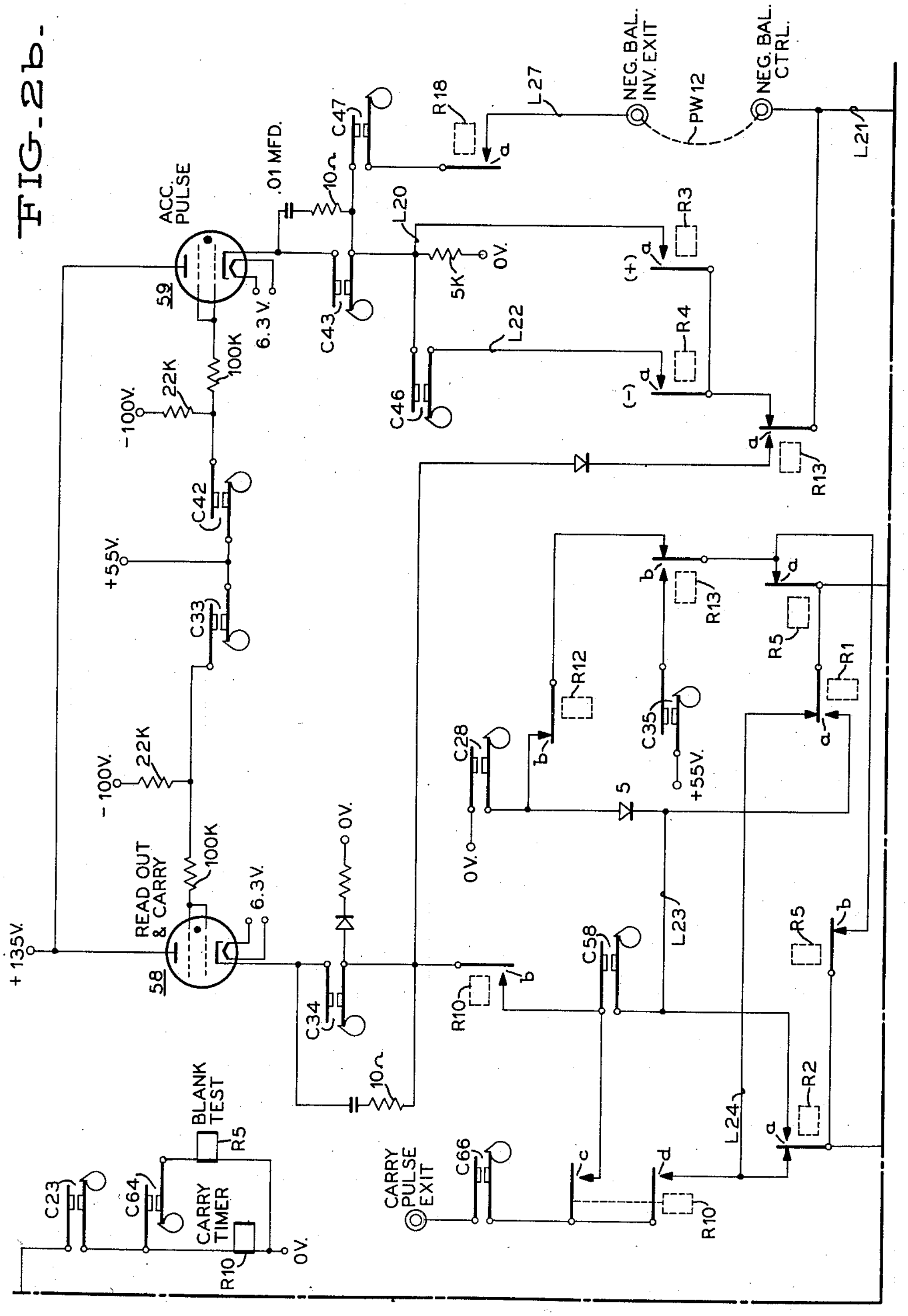
Figure 2C:
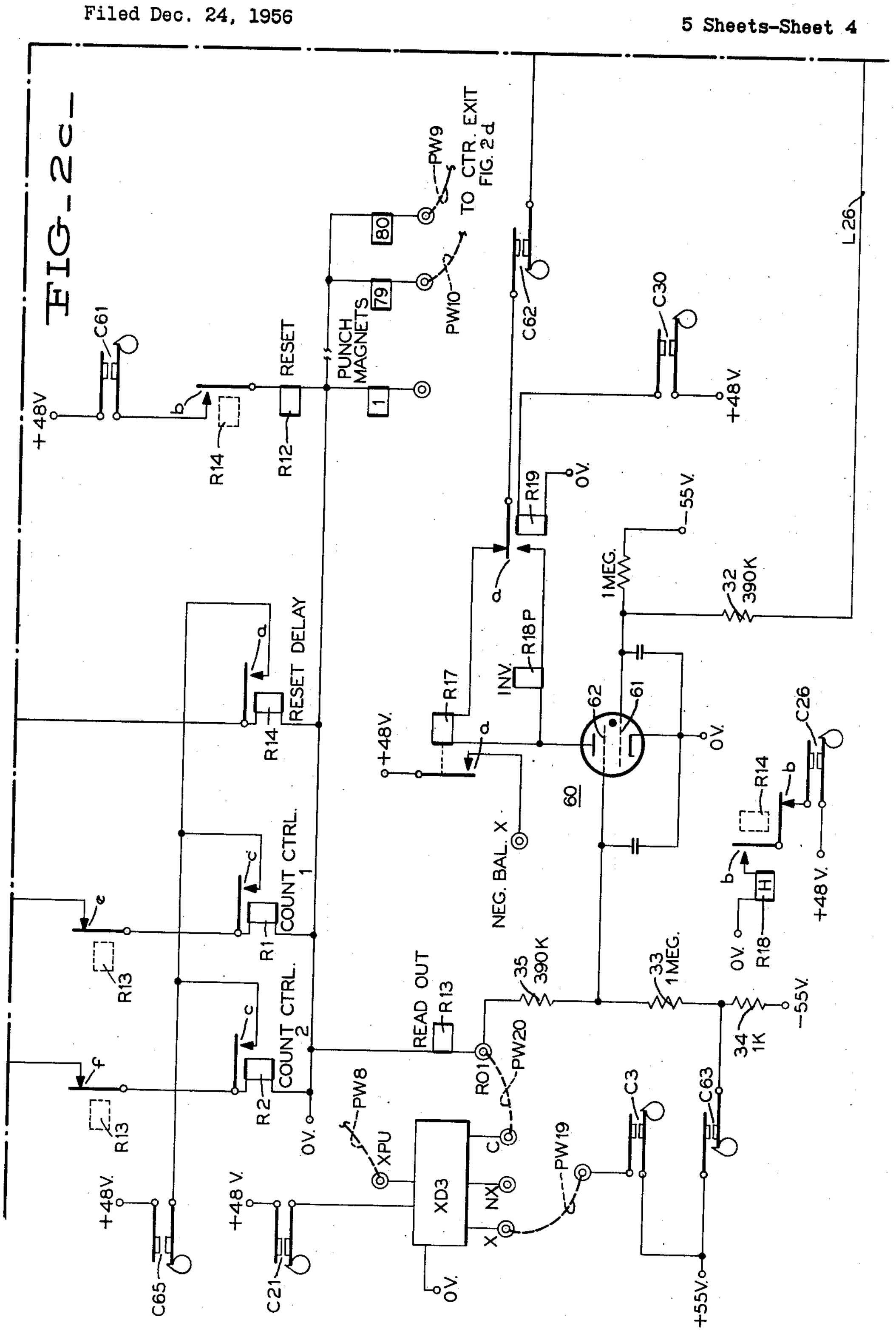
Figure 2D:
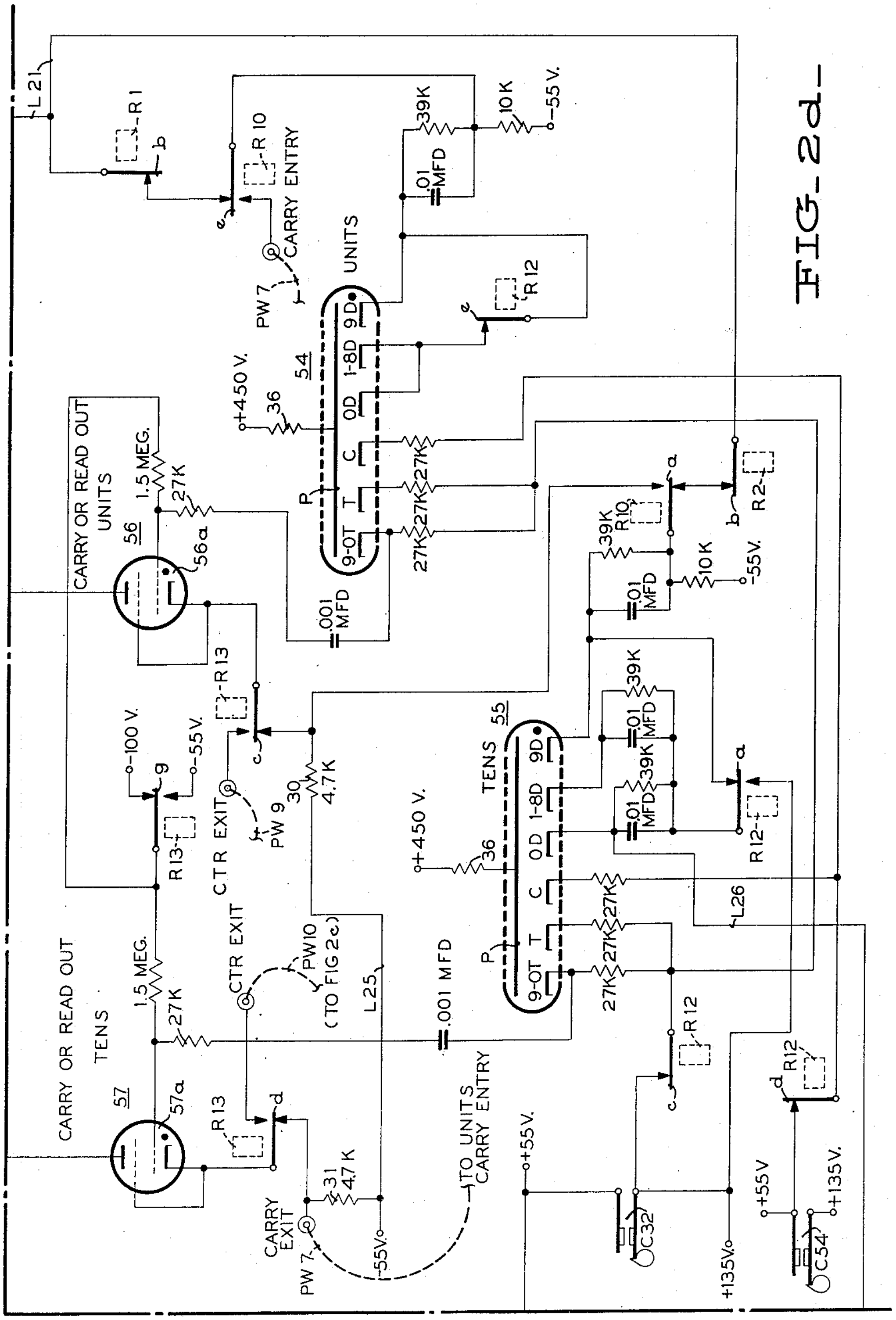

Referring to Fig. 2*d*, the gas tube 54 in the units order position comprises an envelope within which are provided the ten digit representing cathodes, ten complement cathodes, ten transfer cathodes, a plate common to all the cathodes and, of course, an ionizable gas. These cathode elements are diagrammatically shown and only certain ones of them are represented. Viewing these cathodes from right to left we find the extreme right one designated 9D representing the 9 digit cathode. The next cathode identified as 1–8D is representative of eight digit cathodes, namely, 1 through 8. The third cathode identified as 0D represents the 0 digit cathode. The cathodes identified as C and T, respectively, represent ten complement cathodes and ten transfer cathodes. The cathode identified as 9–0T represents the 9 to 0 transfer cathode. The plate identified as P is common to all of the above cathodes and is connected by way of a resistor 36 to a supply of +450 v. The above generally describes the structure of the gas tube associated with each order position of the accumulator.

Each accumulator order position is further provided with a Carry or Readout thyratron, there being two such thyratrons, namely, 56 and 57. Control grid **56*a* has a circuit coupled to the 9–0T cathode of its associated gas tube 54. During either accumulating or readout cycles of operation any time the glow discharge in the accumulator order traverses the 9–0T cathode in its passage from the 9D cathode to the 0**D cathode, a positive signal is transmitted to the associated thyratron to fire the same, and in effect storing, or remembering, the condition described.

The plate circuit of the thyratron 56 is conditioned by contact points associated respectively with a count control relay and a blank test relay the purposes of which having been earlier set forth.

Pulse generating means (Fig. 2*b*) for providing the various sequentially timed pulses for effecting the various operations concerned with addition, subtraction, readout, carry, carry testing, etc., comprises an accumulator pulse thyratron 59 (Acc. Pulse) and a Readout and Carry Pulse thyratron 58. The former provides the sequence of timed pulses necessary to effect addition and subtraction into the accumulator, while the latter thyratron provides the sequence of timed pulses to effect readout and carry operations.

This invention is incorporate in a machine of the type shown and described in the Patent No. 2,053,067 issued to J. M. Cunningham. This machine is commonly referred to as a reproducing punch and is adapted with two record feeding units, namely, a read unit and a punch unit. Perforated record cards are normally placed in the reading unit while blank cards are generally placed in the punch unit. In the normal course of operation of the reproducing punch, the information read from the cards passing through the reading unit is punched into the blank cards passing through the punch unit. For purposes of the invention, the reading unit will be considered rather schematically, and in which unit the perforated cards will be passed with the twelve edge first so that the index point position of the cards, as the latter pass through the machine, will correspond to the cycle point timing of the machine. The basic timing cycle of the machine is shown in the timing chart in Fig. 3 of the drawings. At the top of said chart it will be seen that the major portion of the machine cycle includes the timing corresponding to the index point positions of the record card, namely, 12–11–0–1–2–3–4–5–6–7–8–9.

For the purpose of avoiding an unnecessary lengthy description, only selected portions of the machine have been diagrammatically shown. Referring to Fig. 2*a* of the drawings, there is shown the read feed which has a card hopper, not shown, for receiving a stack of perforated record cards 71. A conventional picker knife arrangement 72 is used to feed the cards singly to appropriate sets of feed rolls 73 in the read unit, which rolls convey the cards in succession through a reading station well known in the art. This reading station is comprised of a line of eighty reading brushes 74 in contact with a current carrying contact roll 75. The eighty reading brushes are disposed each to read an appropriate one of the eighty columns of the card passing through the reading station. The brushes terminate in pluggable sockets, for example RD1 and RD2, which are connected by means of plug wires to convey sensed data to the various units of the machine. Card levers, CL1 and CL2, are disposed along the card path in the machine. These cards levers are adapted to be operated when encountered by cards passing through the reading unit to close appropriate card lever contacts, CL1 and CL2, which enable circuits of a preparatory nature to be closed to operate machine running circuits as well as other circuits, not shown, for coordinating the activities of the machine.

It may be appreciated that entries to the accumulator may also be derived from sources other than records, e. g., storage devices from which signal values 0–9, inclusive, may be extracted on either a static basis or on a differential time basis, the absence of a signal value having the same significance as the blank column in a record field from which an entry is extracted.

A drive motor 80 is employed to provide the motive power necessary to operate the feeding instrumentalities, feed rolls, etc. The feeding instrumentalities include a cam 72*a* and a cooperating follower 72*b* which reciprocates the picker knife 72 to cause feeding of the cards in coordination with the basic timing cycle of the machine. A box 81 is also shown to illustrate diagrammatically the necessary clutching mechanism, timing controls and cams, designated as C cams in the circuit diagrams of the drawings. These C cams operate contacts which provide the necessary timed impulses for controlling among other things the various features of the invention.

A start key 82 is provided to close appropriate circuits to initiate operation of the drive motor. The start key must be held long enough to enable a sufficient number of cards to be fed into the machine to close the card lever contacts to thus enable the card lever control circuits to be operative to run the machine automatically while cards continue to feed. A stop key 83 and appropriate circuits controlled thereby are provided to stop the machine at any time during card feeding operations.

The basic machine as shown is further provided with the necessary circuits for enabling the accumulator, constituting the invention, to perform its various operations such as adding, subtraction, readout, reset, etc. These circuits will now be described. Entry of data, amount data for example, is effected under control of counter entry circuits and a plus control circuit. Two counter entry circuits are shown in Fig. 2*a*, one for each of the two order positions constituting the accumulator. A counter entry circuit includes a Counter Entry socket, a normally closed readout contact and a Count Control relay, the latter being earlier described as the entry controllable means. The Count Control relays are identified as R1 and R2 in Fig. 2*c*, respectively. Relay R1 controls associated R1*a* contacts located in Fig. 2*b* in the units position Carry or Readout thyratron circuits. An R1*b* contact point is located in Fig. 2*d* in a circuit to be described which directs the series of positive pulses to the digit cathodes. In like manner, relay R2 control similar circuits in the tens order position of the accumulator. An obvious hold circuit for each of the relays R1 and R2 is provided, in Fig. 2*c*, to maintain said relays, whenever either or both are picked up, energized for the entry portion of the cycle.

The plus circuit includes a plus relay R3, Fig. 2*a*, connected to a socket identified as CTR+.

The plus relay R3 is energized under control of a machine impulse which is transmitted along a path extending from +48 v. source in Fig. 2*a*, line L28, cam contacts C60 to the Mach. Imp. socket. The machine impulse may be wired directly to the CTR+ socket to energize the plus relay R3 on each machine cycle if adding is to be effected on all cycles, or as is customary, the machine impulse may be conditioned through the well-known X distributor switching means to provide selective operation of the plus relay R3. As shown, an X distributor XD1 controls the energization of the plus relay R3 by way of plug wires PW3 and PW4. (A subtraction relay R4 will be energized under control of plug wires PW4 and PW16 on subtraction cycles.) The X distributor is a switching device having sockets identified as C, X and NX, respectively, and a control input socket labeled XPU, which input socket is generally connected to a control impulse, for example that issued whenever an X perforation is sensed in the card. Under normal conditions, that is when the X distributor is deenergized, the latter enables a signal wired to the socket C to be available at the NX socket. Under an energized condition the X distributor switches the signal to the X socket, the energized position being effected in response to a control signal applied to the input socket XPU. By means of this X distributor, the accumulator can be controlled not only for adding operations but subtracting operations as well in a selective manner.

Continuing with the explanation of an adding operation, it is seen that Counter Entry socket 1, Fig. 2*a*, is connected by means of a plug wire PW1 to reading socket RD2, and that Counter Entry socket 2 is connected by means of a plug wire PW2 to reading socket RD1. These sockets RD1 and RD2 provide the amount data outputs which are derived from the amount fields in the cards passing through the read station. The X distributor XD1 will be maintained in a normal condition for all adding operations by virtue of the absence of a control perforation in the cards having amounts destined for addition. (In subtraction operations, however, a specific X punch will identify those cards having amounts destined for subtraction, which X control provides the signal to energize the X distributor.)

The actual adding operation of the accumulator will now be described. To begin with, the accumulator starts with a 9 setting in each order position thereof. At approximately "11" time of the machine cycle, a complement pulse is applied to the ten digit cathodes to convert the 9 value setting to a 0 value setting. Thereafter a series of ten positive pulses is applied, beginning at zero time in the cycle to the digit cathodes to advance the glow discharge successively in step-by-step manner with each positive pulse supplied. This advancement continues until a digit perforation is encountered in the card controlling the appropriate order position whereupon the count control relay is energized to open up the path conducting the series of positive pulses being applied to the digit cathodes. The number of pulses thus supplied is equal to the value of the digit perforation sensed. After "9" time of the cycle a second complement pulse is applied to the accumulator to cause the digit value settings to be complemented for the second time in the cycle, thus leaving the nines complement value of the amount value sensed in the card.

The circuit means for transmitting the necessary sequence of timed positive pulses to the accumulator during adding operations is by way of a path (Fig. 2*b*) extending through the accumulator pulse thyratron 59 (whose control grids are both under control of cam contacts C42), then through cam contacts C43,) line L20, plus relay R3*a* normally open contact points, readout relay R13*a* normally closed contacts, line L21, count control relay R2*b* normally closed contact points, in Fig. 2*d*, carry timer relay R10*a* normally closed contact points, to and through an RC network to the 9D cathode and to the remaining digit cathodes 0D, 1–8D by way of a reset relay R12*a* normally closed contacts. Along this path twelve positive pulses are issued during each adding cycle, the first and last pulses are for complementing the value in the accumulator while the intervening ten pulses are used for adding purposes to advance the glow discharge in the manner set forth.

During the application of the first and second complement pulses, the transfer cathodes T are influenced by +135 volts while the complement cathodes C are influenced by +55 volts. This results in the complement cathodes being the more effective to control the operations of the glow discharge. The reverse condition is true for the intervening portion of the cycle, that is, from 0 through 9 time, the transfer cathodes T have applied thereto +55 volts while the complement cathodes C have applied thereto +135 volts, rendering the transfer cathodes the more effective to control operations of the glow discharge.

The circuit means for transmitting the necessary sequence of timed positive pulses to the accumulator during subtraction operations is by way of a path extending through the thyratron 59 (Fig. 2*b*), cam contacts C43, cam contacts C46, line L22, minus relay **R4*a* normally open contact points and then continuing by way of the path described above for the adding operation. Along this path only the ten positive pulses are applied to the digit cathodes, the first and last complementing positive pulses, employed for adding operation, being eliminated by virtue of the timing of cam contacts C46**.

Circuit means for transmitting positive pulses to the respective plates associated with each of the Carry or Readout thyratrons, 56 and 57, for carry operations includes the Readout and Carry Pulse thyratron 58 (Fig. 2*b*) whose control grid and cathode, respectively, are activated by cam contacts C33 and C34. This arrangement enables a train of eleven positive pulses to be issued on each cycle of operation. During carry operations only the eleventh pulse, the carry pulse, of this train of pulses is transmitted by means of a path which extends through the Readout and Carry Pulse thyratron 58, cam contacts C34, carry timer relay **R10*b* normally open contacts, cam contacts C58, line L23, the count control relays R1*a* and R2*a* normally open contact points to the plates of the Carry or Readout thyratrons 56 and 57** shown in Fig. 2*d*.

Another carry circuit path providing a carry pulse to the Carry or Readout thyratrons 56 and 57, in cycles in which blank columns, i. e., invalid entries, are encountered during an entry operation, is traceable through the Readout and Carry Pulse thyratron 58, cam contacts C34, carry timer relay R10*b* normally open contact points, relay R10*c* normally open contact points, relay R10*d* normally open contact points, line L24 to the normally closed contact points associated with the count control relay controlled by the blank column, to the plate of the appropriate Carry and Readout thyratron.

During entry operations in which blank columns are encountered a zero potential is applied to the plates of the Carry or Readout thyratrons 56, 57 by means of a circuit path extending from a zero voltage source (Fig. 2*b*), through cam contacts C28, reset relay **R12*b* normally closed contact points, readout relay R13*b* normally closed contact points, blank test relay R5*a* and R5*b* normally closed contacts to the plate of the respective Carry and Readout thyratrons 56, 57** in Fig. 2*d*. Another circuit path for applying the same zero voltage during the entry portion of each cycle as punched columns are encountered is traceable from the same zero supply, through cam contacts C28, diode 5, and through the normally open contacts of the appropriate count control relay **R1*a* and R2*a*** to the plates of the appropriate Carry or Readout thyratrons.

Circuits are provided to enable a carry to be stored during an entry portion of a cycle whenever a carry is yielded by the associated order position of the accumulator. A typical enabling circuit whereby a zero potential is applied to the plate, extends through cam contacts C28 (Fig. 2*b*), relay **R12*b* normally closed contact points, relay R13*b* normally closed contact points, blank test relay contacts R5*a* and R5*b* to their respective plates. Assuming that the grids controlling the Carry or Readout thyratron 56 in the units order position is energized in response to a carry, the circuit then continues through the thyratron 56, its cathode, relay R13*c* normally closed contacts, resistor 30, line L25 to −55 v. source. This circuit enables the thyratron to be fired and maintained in the fired state until the associated blank test contact opens whereupon the status of the associated count control relay contact determines whether conduction of the thyratron should or should not continue. If the carry is valid, conduction continues. If invalid, conduction is terminated. During the carry portion of the cycle only the conducting thyratron permits the carry pulse to be directed to the appropriate next higher order to effect the carry. A typical path for supplying plate voltage during the carry operation whereby conduction is maintained extends through the normally open count control relay contacts R1*a*, diode 5, through cam contacts C28** and finally to the zero volt supply.

If, however, the carry is an invalid one, there will be no path available to maintain conduction of the thyratron upon the opening of the blank test contacts, since the appropriate count control relay had not been energized to provide the necessary shunt paths to maintain conduction. Accordingly the thyratron extinguishes and in effect canceling the invalid stored carry. Immediately after the thyratron is extinguished, a circuit path is provided to enable propagated carries to be effected if the occasion requires. This circuit provides a zero potential on the plates of the Carry or Readout thyratrons by way of a path extending from the zero volt source (Fig. 2*b*), through cam contacts C28, diode 5, line L23, cam contact C58, relay **R10*c* normally open contacts, relay R10*d* normally open contacts, line L24, the normally closed contacts of relay R1*a* or R2*a* to the respective plates of the thyratrons 56, 57. This last-mentioned circuit closes before the carry pulse is applied to enable the latter pulse to cause propagated carries to be entered into the respective higher order accumulator positions where necessary. A typical circuit for propagating a carry into a higher order position is traceable as follows: Beginning with the Readout and Carry Pulse thyratron 58** (Fig. 2*b*) the carry pulse passes through cam contacts C34, relay **R10*b* normally open contact points, relay R10*c* normally open contact points, R10*d* normally open contact points, line L24, relay R1*a* normally closed contacts, through the plate and cathode of the units order Carry or Readout thyratron 56** (Fig. 2*d*), relay **R13*c* normally closed contacts, relay R10*a* normally open contacts to the digit cathodes of the next higher order position of the accumulator (the tens order in this instance). This positive carry pulse causes the tens order position to advance its digit value setting by one. Assuming further that the tens order position had been setting at 9 then a carry would be propagated to its associated Carry or Readout thyratron 57 and be conveyed to the hundreds order position, on the assumption of course that the accumulator has at least another order position. However, in the case of the instant two-order position, the propagated carry will pass back to the units order position during the carry operation of the cycle by way of a path which includes Carry Exit socket in the tens order position, plug wire PW7, Carry Entry socket in the units order position, relay R10*e*** normally open contacts, to the digit cathodes in the units order position of the accumulator.

A valid carry is caused by feeding a carry pulse through an appropriate Carry or Readout thyratron by way of a path beginning with the Readout and Carry Pulse thyratron 58 (Fig. 2*b*), through cam contacts C34, relay **R10*b* normally open contacts, cam contacts C58, line L23, the normally open contacts of the appropriate count control relay and the appropriate Carry or Readout thrytron to the digit cathodes of the next higher order position of the accumulator. A zero potential is maintained on the plates of the Carry or Readout thyratrons 56, 57** during valid carry operations by means of a path extending from the zero volt supply (Fig. 2), through cam contacts C28, diode 5 and then by way of the normally open contacts of the appropriate count control relays.

During a readout operation a potential of +55 v. is applied to the plates of the Carry or Readout thyratrons 56, 57 by way of a circuit path extending from a +55 v. source (Fig. 2*b*), through cam contacts C35, readout relay R13*b* normally open points, through the normally closed contacts of the blank test relays to the respective plates of the Carry or Readout thyratrons 56, 57.

During the various operating cycles mentioned above, the cathodes of the Carry or Readout thyratrons 56, 57 are supplied by a −55 v. source, shown in Fig. 2*d*, by means of obvious circuit paths conditioned by readout relay contact points the parent relay R13 for which being controlled in a manner to be described.

Readout from the accumulator is effected by first energizing a readout relay R13, seen in Fig. 2*c*, at an appropriate time in the cycle. For convenience, the readout relay circuit is conditioned by an X distributor, XD3, whose XPU socket is controlled by a plug wire PW8 connection to a read brush, not shown, which is activated upon the sensing of a designated X perforation in the card passing through the reading station. When this designated X is sensed, XD3 is accordingly energized to activate the relay R13 by means of a path extending from +55 volt source (Fig. 2*c*), cam contacts C3, plug wire PW19, X socket, C socket, plug wire PW20, RO1 socket, relay R13, to a zero volt source. In consequence thereof relay contacts R13*a* through relay R13*f*, distributed throughout the accumulator circuits, are switched to cause the following circuits to be set up: A circuit is set up under control of relay R13*b* contacts (Fig. 2*b*) and cam contacts C35 to apply ten positive 55 volt pulses to the plates of the Carry or Readout thyratrons 56, 57. The relay R13*c* and R13*d* contacts (Fig. 2*d*) transfer their respective outputs to associated counter exit sockets, Ctr. Exit, to provide respective digit value readout signals which may be wired to any desirable recording unit. In the embodiment shown, these readout digit value signals are transmitted by way of plug wires PW9 and PW10 to control the familiar punch magnets, a few of which are shown in Fig. 2*c*, of the reproducing machine for recording these values.

Upon the transfer of relay R13*a* contacts (Fig. 2*b*), the readout positive signals are applied to each order position of the accumulator to cause the glow discharge to be advanced in step-by-step fashion. During this operation, when the glow traverses the 9–0T cathode, a positive signal is transmitted to the control grid of the associated Carry or Readout thyratron. This causes the latter thyratron to fire and thus provide a positive 55 volt signal (controlled by cam contacts C35) at the counter exit socket associated with said thyratron. The relay contacts R13*e* and R13*f* (Fig. 2*c*) open up to prevent energization of the count control relays R1 and R2.

It must be appreciated that positive amounts in the accumulator are registered in complement form whereas negative amounts are registered in true form. Means are provided to convert these values at appropriate times so that the value outputs will be read out in proper form.

The presence of a negative amount in the accumulator is manifested by a zero representation in the highest order position. Appropriate means are provided to scan the condition of the zero digit cathode 0D of the highest order position. This means includes a circuit connection L26 (Fig. 2*d*) from said cathode along which a positive up level is transmitted in response to the presence of the glow discharge on said zero digit cathode. An inversion thyratron 60 (Fig. 2*c*) is provided to control a negative balance X relay R17 and an inversion relay R18, the former providing an appropriate X signal when the relay R17 is energized, which X signal is available at a negative balance X socket (Neg. Bal. X). This X signal may be recorded as an X perforation in the card receiving the negative amount to provide an appropriate identification thereof. The inversion relay R18 is employed to provide a complement pulse before and after readout from the accumulator so as to provide a true amount during readout and then to restore the amount back to its negative settings after readout.

The circuits involved in this operation will now be explained. The zero digit cathode OD (Fig. 2*d*) of the highest order position 55 is connected to a control grid 61 (Fig. 2*c*) of the thyratron 60 by way of a path extending from the zero digit cathode, line L26, resistor 32, to the control grid 61. When the glow discharge rests on the zero digit cathode OD a positive up level is applied to energize grid 61. Grid 62 of thyratron 60 is normally biased relatively negatively by way of a path extending through resistors 33 and 34 to a −55 volt source. At an appropriate time in the readout cycle a positive gate signal is applied to grid 62 by way of a path extending from +55 volt source, cam contacts C63, resistor 33 to grid 62, thus causing the thyratron 60 to fire thereby energizing relay R17. In response to the energization of relay R17, an associated R17*a* contact is closed to provide the appropriate X signal mentioned above. Immediately thereafter, thyratron 60 is extinguished (Fig. 2*c*) under control of cam contacts C62. Upon the transfer of relay R19*a* contacts and the subsequent closure of cam contacts C62, and with grid 62 energized, thyratron 60 is again fired, this time energizing inversion relay R18P. The grid 62 is energized during a readout operation at a time when relay R13 is energized. A hold circuit for relay R18H, under control of cam contacts C26, maintains the R18*a* and R18*b* contacts energized long enough to enable a complement pulse to be applied before and after the readout operation. The complement pulse before and after readout is applied by way of the accumulating pulse thyratron 59 (Fig. 2*b*), cam contacts C43, cam contacts C47, inversion relay R18*a* normally open contacts, line L27, negative balance inversion exit socket (Neg. Inv. Exit), plug wire PW12, negative balance control (Neg. Bal. Ctrl.) socket, line L21, relay R2b normally closed contacts, realy R10*a* normally closed contacts to the digit cathodes of the tens order position of the accumulator. At the same time, the same complement pulse is applied to the digit cathodes of the units order position 54 by way of a branch path which includes relay R1*b* normally closed contacts and the relay R10*e* normally closed contacts.

Reset of the accumulator is under control of appropriate circuits which include a reset delay relay R14 and a reset relay R12 (Fig. 2*c*). Relay R14 is energized by way of a path extending from zero volt supply, reset delay relay R14, reset socket, plug wire PW13, through X and C sockets associated with X distributor XD2, plug wire 14, the machine impulse (Mach. Imp.) socket, cam contact C60 to +48 v. source. The X distributor XD2 is under control of an appropriate X perforation in the card, which X perforation provides a signal that is transmitted by way of plug wire PW15 to the XPU socket of XD2. In response to the energization of relay R14, its associated contact R14*b* closes, the latter in conjunction with cam contact C61 enables a circuit path to be closed to energize the reset relay R12 (Fig. 2*c*). A hold circuit for relay R14 is under control of relay contacts R14*a* and cam contacts C65.

Upon energization of reset relay R12, associated contacts R12*a* through R12*e* operate to effect the following conditions: The reset contacts R12*c* and R12*d* (Fig. 2*d*) open circuits to both the complement cathodes C and the transfer cathodes T of the accumulator, causing these cathodes to be isolated at a high potential. Reset contacts R12*a* and R12*e* (Fig. 2*d*) isolate the digit cathodes D1 through D8 of the accumulator. The only remaining cathodes not isolated are the nine digit cathodes 9D of each order position of the accumulator. This arrangement enables the glow discharge to seek the 9 digit cathode in each order position during a reset operation to reset the accumulator to 9. A preparatory reset circuit, not shown, provides a nine reset on run in cycles in preparation for the initial operation of the accumulator.

The invention may also be applied in other ways, one in particular being to control any type of utilization means which may take the form of a printing element, punching element or other indicating means. The utilization means may be controlled selectively by the carry output of a single order accumulator adapted with the carry enabling means constituting the subject matter of the invention.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A cyclically operable accumulator adapted to accumulate data value entries characterized as either valid or invalid, the former containing a value where such is intended, the latter not containing a value where a value is intended, which entries are presented for accumulation each during the entry portion of a cycle constituted further of a carry portion, a valid digit entry enabling a corresponding digit value to be accumulated, while an invalid entry enables a value to be accumulated which in effect yields but a carry, comprising in combination: a plurality of denominationally ordered accumulating elements of the type which are differentially operable to store, in response to a valid digit entry, a corresponding digit value, and a value which has no effect except to yield a carry in response to an invalid entry; entry means associated with each order element for receiving the data entries presented for entry and including entry controllable means rendered responsive to valid entries and nonresponsive to invalid entries; individual carry storing means associated with each order element and adapted to receive carries, irrespective of character, yielded by the associated order during either the entry or carry portions of a cycle and including normally ineffective carry coupling means between the carry storing means and the related next higher order accumulator element; carry storage enabling means connected to said carry storage means and including first and second switch controls, the first switch control being normally effective during the entry portion of each cycle to enable carries, irrespective of their character, to be stored, said second switch control rendered effective under control of said entry controllable means in response to valid entries to render the stored carries available for carry transmission during the carry portion of the cycle; means operative after the completion of the entry portion but before the carry portion of the cycle to operate the first switch control to cause either a suppression of the stored carry whenever said second switch control is noneffective, or a retention of the stored carry whenever said second switch control is effective; and carry transmitting means including means to render the coupling means effective at the carry portion of the cycle to enter the retained stored valid carries, and those yielded during the carry portion of the cycle, into appropriate ordered elements.

2. A cyclically operable accumulator adapted to accumulate data value entries characterized as either valid or invalid, the former containing a value where such is intended, the latter not containing a value where a value is intended, which entries are presented for accumulation each during the entry portion of a cycle constituted further of a carry portion, a valid digit entry enables a corresponding digit value to be accumulated, while an invalid entry enables a value to be accumulated which in effect yields but a carry, comprising in combination: a plurality of denominationally ordered accumulating elements of the type which are differentially operable to store, in response to a valid digit entry, a corresponding digit value, or to store a value which has no effect on storage except to yield a carry in response to an invalid entry; entry means associated with each order for receiving the data entries presented for entry and including entry controllable means rendered responsive to valid entries and nonresponsive to invalid entries; individual carry storing means associated with each order position and adapted to receive carries, irrespective of character, yielded by the associated order during either the entry or carry portions of a cycle and including normally ineffective carry coupling means between the carry storing means and their related next higher order accumulator positions; carry storage enabling means connected to said carry storage means and including first and second switch controls connected in parallel relationship, the first switch control being normally effective during the entry portion of each cycle to enable carries, irrespective of their character, to be stored, said second switch control rendered effective under control of said entry controllable means in response to valid entries to render the stored carries available for carry transmission during the carry portion of the cycle; means operative after the completion of the entry portion but before the carry portion of the cycle to operate the first switch control to cause either a suppression of the stored carries whenever said second switch control is noneffective, or a retention of the stored carries whenever said second switch control is effective; and carry transmitting means including means to render the coupling means effective at the carry portion of the cycle to enter the retained stored valid carries, and those yielded during the carry portion of the cycle, into appropriate order positions.

3. A cyclically operable accumulator according to claim 2 in which the entry portion of the cycle has index point positions 0–9, inclusive, corresponding to the digit values 0–9 and in which the digit values of the data entries are presented for entry in the order 0–9.

4. A cyclically operable accumulator adapted to accumulate data value entries characterized as either valid or invalid, the former containing a value where such is intended, the latter not containing a value where a value is intended which entries are presented for accumulation each during the entry portion of a cycle constituted further of a carry portion, a valid digit entry enables a corresponding digit value to be accumulated, while an invalid entry enables a value to be accumulated which in effect yields but a carry, comprising in combination a plurality of denominationally ordered accumulating devices each comprising ten digit representing elements 0–9, inclusive, and arranged to form a closed continuous path, including means for activating the elements in succession; signal generating means for supplying a series of ten signals during each entry portion of a cycle to the actuating means to cause activation of the elements in succession, which activation begins at zero time of each cycle and terminates at differential times in the cycle upon the entry of a valid digit value, the number of such activations being equal to the value of the valid entry and in the case of an invalid entry ten such activations are effected which in effect reflects no change in the accumulated value except to yield an invalid carry, means responsive to yield a carry whenever the activation proceeds to a designated one of the elements either during entry or carry portions of the cycle; entry means associated with each order device for receiving the data entries presented for entry and including entry controllable means rendered responsive to valid entries and nonresponsive to invalid entries; individual carry storing means associated with each order device and adapted to receive carries, irrespective of character, yielded by the associated order during either the entry or carry portions of a cycle and including normally ineffective carry coupling means connected between the carry storing means and their related next higher order accumulator devices; carry storage enabling means connected to said carry storage means and including first and second switch controls, the first switch control being normally effective during the entry portion of each cycle to enable carries, irrespective of their character, to be stored, said second switch control rendered effective under control of said entry controllable means in response to valid entries to render the stored carries available for carry transmission during the carry portion of the cycle; means operative after the completion of the entry portion but before the carry portion of the cycle to operate the first switch control to cause either a suppression of the stored carries whenever said second switch control is noneffective, or a retention of the stored carry whenever said second switch control is effective; and carry transmitting means including means to render the coupling means effective at the carry portion of the cycle to enter the retained stored valid carries, and those yielded during the carry portion of the cycle, into appropriate order devices.

5. A cyclically operable accumulator adapted to accumulate data value entries characterized as either valid or invalid, the former containing a value where such is intended, the latter not containing a value where a value is intended, which entries are presented for accumulation each during the entry portion of a cycle constituted further of a carry portion, a valid digit entry enables a corresponding digit value to be accumulated, while an invalid entry enables a value to be accumulated which in effect yields but a carry, comprising in combination a plurality of denominationally ordered multi-cathode glow discharge devices of the character described, each including ten digit representing cathodes, and operable in step-by-step manner to store a digit value; pulse generating means for supplying a series of ten pulses during each entry portion to effect the step-by-step operations of the devices, the number of step-by-step operations being dependent upon the digit value entered to effect storage of a corresponding value and, in the case of an invalid entry, ten such step-by-step operations being effected to yield but an invalid carry; carry yielding means associated with each device and responsive to yield a carry when a step-by-step operation proceeds from nine to zero; entry means associated with each order device for receiving the data entries presented for entry and including entry controllable means rendered responsive to valid entries and nonresponsive to invalid entries; individual carry thyratrons for each order device including a plate, cathode and a control grid, and means coupling the latter to the carry yielding means of the associated order device; normally ineffective carry coupling means connected between the cathode of the thyratron and the related next higher order device; carry storage enabling means including a source of plate potential, a circuit therefor including first and second switch controls, the first switch control being normally effective during the entry portion of each cycle to apply the plate potential to enable the thyratron to be fired when the associated grid is energized in response to a yielded carry, the second switch control rendered effective under control of said entry controllable means in response to valid entries to also apply plate potential to maintain the fired thyratron in a conductive state during the carry portion of the cycle; means operative after the completion of the entry portion but before the carry portion of the cycle to open the first switch control to either disable conduction when the second switch is noneffective in response to an invalid entry, or to retain conduction when said second switch is effective in response to a valid entry; a carry pulse generator, including means for applying a carry pulse to the plates of the respective carry thyratrons during the carry portion of each cycle; and means to render the coupling means effective to pass the carry pulse through all conducting carry thyratrons and into respective appropriate higher order devices to effect unit carries therein.

6. An accumulator as in claim 5 further provided with reset means for resetting the accumulator to a nine setting, and including additional normally ineffective carry coupling means to provide for carries from the highest order to the lowest order.

7. An accumulator as in claim 6 further adapted with appropriate adding and subtracting control means to effect storage of positive and negative entries, and complementing means for effecting a 9's complement operation of the stored values prior to and after the entry portion of a cycle in which positive entries are effected.

8. In combination a decimal accumulating element controlled by records having columns for bearing data and in each of which the presence of any one of the data designations, 0–9, inclusive, constitutes a valid entry which enables a corresponding value to be stored in the element, the absence of the designation constituting an invalid entry that enables a value to be stored which in effect provides no change in the element except to yield a carry; an entry means for the element and including entry controllable means responsive to valid entries and nonresponsive to invalid entries; carry yielding means for the element and adapted to yield a carry whenever the element passes from 9 to 0 in response to entries; an associated carry storage means, including connections to said carry yielding means which enables the storage means to receive a carry; carry storage enabling means, including first and second switch controls, the first switch control being normally effective during the entry of data to enable a carry, irrespective of character, to be stored, the second switch control rendered effective under control of said entry controllable means in response to a valid entry to render a stored carry available for readout; and means operative after entry has been completed to open said first switch control to either suppress the stored carry whenever the second switch control is noneffective in response to a valid entry, or, retain the stored carry whenever the second switch control is effective in response to a valid entry; and means for reading out the retained stored carry before the next entry.

9. In combination a decimal accumulating element controlled by records having columns for bearing data and in each of which the presence of any one of the data designations, 0–9, inclusive, constitutes a valid entry which enables a corresponding value to be stored in the element, the absence of the designation constituting an invalid entry that enables a value to be stored which in effect provides no change in the element except to yield a carry signal; an entry means for the element and including entry controllable means responsive to valid entries and nonresponsive to invalid entries; carry yielding means for the element and adapted to yield a carry signal whenever the element passes from 9 to 0 in response to entries; an associated electronic carry storage means having OFF and ON conditions of stability, respectively, to indicate storage and nonstorage, and effective in response to a carry signal to assume an ON condition, including connections to said carry yielding means which enables the electronic storage means to receive a carry signal; carry storage enabling means, including first and second switch controls, the first switch control being normally effective during the entry of data to enable a carry signal, irrespective of character, to cause the electronic carry storage means to assume an ON condition, the second switch control rendered effective under control of said entry controllable means in response to a valid entry to maintain the ON condition of the electronic carry storage means for an interval after the completion of an entry; and means operative after entry has been completed to open said first switch control to cause the electronic carry storage means to assume an OFF condition whenever the second switch control is noneffective in response to an invalid entry, or, to maintain the ON condition whenever the second switch control is effective in response to a valid entry; and a utilization circuit including connections, effective during the interval, to read out the ON condition of the electronic carry storage means.

10. In combination a decimal accumulating element controlled by records having columns for bearing data and in each of which the presence of any one of the data designations, 0–9, inclusive, constitutes a valid entry which enables a corresponding value to be stored in the element, the absence of the designation constituting an invalid entry that enables a value to be stored which in effect provides no change in the element except to yield a carry signal; an entry means for the element and including entry controllable means responsive to valid entries and nonresponsive to invalid entries; carry yielding means for the element and adapted to yield a carry signal whenever the element passes from 9 to 0 in response to entries; a thyratron having a plate, a cathode and a control grid, and means coupling the latter to the yielding means; a source of plate potential, a circuit therefor including first and second switch controls, the first switch control being normally effective during an entry to apply the plate potential to enable the thyratron to conduct when the grid is influenced by a carry signal, the second switch control rendered effective under control of said entry controllable means in response to a valid entry to also apply plate potential to maintain conduction of the thyratron for an interval following the completion of an entry; means operative after completion of an entry to open the first switch control to stop conduction of the thyratron whenever the second switch control is noneffective in response to an invalid entry, or, to maintain conduction whenever the second switch control is effective in response to a valid entry; and means effective during the interval for effecting a readout in response to the conductive status of the thyratron.

11. In combination a decimal accumulating element controlled by records having columns for bearing data and in each of which the presence of any one of the data designations, 0–9, inclusive, constitutes a valid entry which enables a corresponding value to be stored in the element, the absence of the designation constituting an invalid entry that enables a value to be stored which in effect provides no change in the element except to yield a carry signal; an entry means for the element and including entry controllable means responsive to valid entries and nonresponsive to invalid entries; carry yielding means for the element and adapted to yield a carry signal whenever the element passes from 9 to 0 in response to entries; a thyratron having a plate, a cathode and a control grid, and means coupling the latter to the yielding means; a source of plate potential, a circuit therefor including first and second switch controls, the first switch control being normally effective during an entry to apply the plate potential to enable the thyratron to conduct when the grid is influenced by a carry signal, the second switch control rendered effective under control of said entry controllable means in response to a valid entry to also apply plate potential to maintain conduction of the thyratron from an interval following the completion of an entry; and means operative after completion of an entry to open the first switch control to stop conduction of the thyratron whenever the second switch control is noneffective in response to an invalid entry, or, to maintain conduction until after the interval whenever the second switch control is effective in response to a valid entry.

No references cited.